(12) United States Patent
Curtis-Maury et al.

(10) Patent No.: US 10,140,021 B2
(45) Date of Patent: Nov. 27, 2018

(54) ADAPTIVE DATA-PARTITIONING MODEL THAT RESPONDS TO OBSERVED WORKLOAD

(71) Applicant: NetApp, Inc., Sunnyvale, CA (US)

(72) Inventors: Matthew Curtis-Maury, Sunnyvale, CA (US); Ram Kesavan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 193 days.

(21) Appl. No.: 14/757,430

(22) Filed: Dec. 23, 2015

(65) Prior Publication Data

US 2017/0185304 A1   Jun. 29, 2017

(51) Int. Cl.
*G06F 3/06* (2006.01)

(52) U.S. Cl.
CPC ............ *G06F 3/0605* (2013.01); *G06F 3/061* (2013.01); *G06F 3/067* (2013.01); *G06F 3/0631* (2013.01); *G06F 3/0644* (2013.01)

(58) Field of Classification Search
CPC .... G06F 3/0631; G06F 3/0643–3/0644; G06F 3/067; G06F 9/50; G06F 9/5055; G06F 9/5061; G06F 3/0635; G06F 3/0629; G06F 3/0653
See application file for complete search history.

(56) References Cited

U.S. PATENT DOCUMENTS

| 8,255,915 | B1 * | 8/2012 | Blanding | G06F 9/5027 |
| | | | | 718/104 |
| 8,566,546 | B1 * | 10/2013 | Marshak | G06F 3/0604 |
| | | | | 711/112 |
| 8,768,916 | B1 * | 7/2014 | Ghazal | G06F 17/30592 |
| | | | | 707/719 |
| 8,972,694 | B1 * | 3/2015 | Dolan | G06F 13/28 |
| | | | | 711/170 |
| 9,335,948 | B1 * | 5/2016 | Kirac | G06F 3/0649 |
| 9,507,887 | B1 * | 11/2016 | Wang | G06F 17/5009 |
| 9,672,072 | B1 * | 6/2017 | Peeters | G06F 9/5077 |
| 9,720,989 | B2 * | 8/2017 | Theimer | G06F 17/30569 |
| 9,811,380 | B1 * | 11/2017 | Martin | G06F 9/50 |
| 2002/0166031 | A1 * | 11/2002 | Chen | G06F 12/0813 |
| | | | | 711/141 |
| 2003/0079151 | A1 * | 4/2003 | Bohrer | G06F 1/3203 |
| | | | | 713/320 |
| 2004/0257985 | A1 * | 12/2004 | Sahai | H04L 41/5025 |
| | | | | 370/229 |
| 2005/0257003 | A1 * | 11/2005 | Miyazaki | G06F 3/0605 |
| | | | | 711/114 |
| 2006/0277205 | A1 * | 12/2006 | Song | G06N 5/02 |
| 2007/0198979 | A1 * | 8/2007 | Dice | G06F 9/466 |
| | | | | 718/100 |

(Continued)

*Primary Examiner* — Midys Rojas
*Assistant Examiner* — Khoa D Doan
(74) *Attorney, Agent, or Firm* — Klein, O'Neill & Singh, LLP

(57) ABSTRACT

Methods, non-transitory computer readable media, and devices for dynamically changing a number of partitions at runtime in a hierarchical data partitioning model include determining a number of coarse mapping objects, determining a number of fine mapping objects, and setting a number of coarse partitions and a number of fine partitions based on the determined number of coarse mapping object and the determined number of fine mapping objects.

21 Claims, 11 Drawing Sheets

(56) References Cited

U.S. PATENT DOCUMENTS

| | | | | |
|---|---|---|---|---|
| 2008/0104608 A1* | 5/2008 | Hyser | .................... | G06F 9/5027 |
| | | | | 718/105 |
| 2009/0132611 A1* | 5/2009 | Brown | .............. | G06F 17/30575 |
| 2009/0276588 A1* | 11/2009 | Murase | ................. | G06F 3/0608 |
| | | | | 711/160 |
| 2010/0125565 A1* | 5/2010 | Burger | .............. | G06F 17/30433 |
| | | | | 707/713 |
| 2013/0080477 A1* | 3/2013 | Evans | .............. | G06F 17/30961 |
| | | | | 707/802 |
| 2014/0280298 A1* | 9/2014 | Petride | .............. | G06F 17/30489 |
| | | | | 707/769 |
| 2015/0178012 A1* | 6/2015 | Kim | ....................... | G06F 3/0644 |
| | | | | 711/114 |
| 2015/0200833 A1* | 7/2015 | Cutforth | ............. | H04L 67/1097 |
| | | | | 709/224 |
| 2015/0339369 A1* | 11/2015 | Rais-Ghasem | ... | G06F 17/30589 |
| | | | | 707/739 |
| 2017/0139910 A1* | 5/2017 | Mcalister | .......... | G06F 17/30584 |
| 2017/0177414 A1* | 6/2017 | Newbern | .............. | G06F 9/5072 |

* cited by examiner

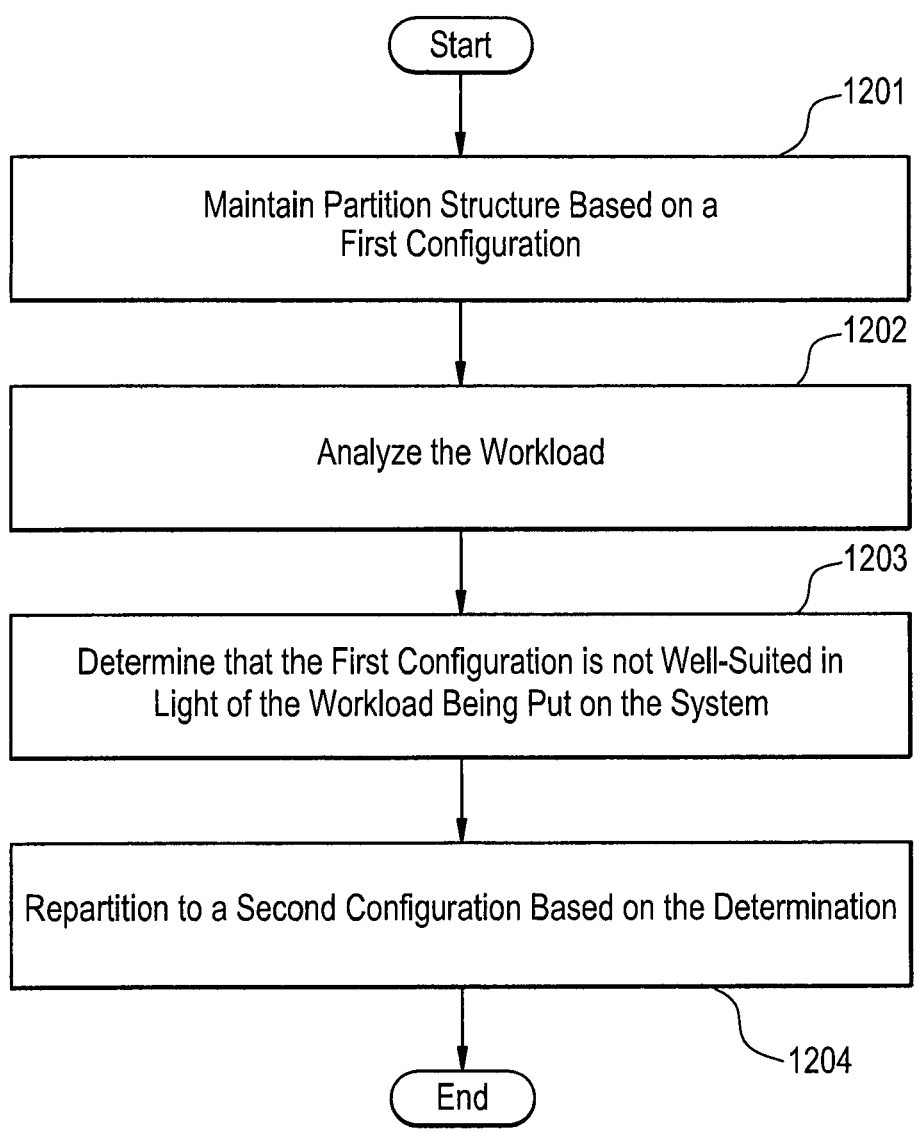

ADAPTIVE DATA-PARTITIONING MODEL THAT RESPONDS TO OBSERVED WORKLOAD

BACKGROUND

Technical Field

The present disclosure relates generally to a data partitioning for improved parallelism in data processing.

Description of Related Art

The concept of parallelism, in computing, is based on dividing a large problem into several small problems, which can then be tackled substantially simultaneously, reducing the overall length of time required to solve the problem. Locking is a programming tool which permits one thread to take control of a variable and prevent other threads from accessing it, until the variable is unlocked. Many storage systems utilize a model of parallelism in which data partitions are employed to minimize locking. Locking is not required under the model of parallelism because a given thread is assigned exclusive access to certain data objects. This is beneficial because a) locking can be expensive and b) locking requires a code re-write to become safe to execute on multiple CPUs.

Furthermore, some systems utilize a hierarchical data partitioning framework. This allows threads to exclude multiple partitions from being accessed, thereby providing broader object protection.

However, the conventional data partitioning models require a preset fixed number of partitions, which is not optimal for all workloads. Under such a conventional model the number of partitions may be insufficient for an offered workload. Specifically, since only a single thread can process a data partition at a time, if the workload maps to only a few partitions, then the parallelism will be low.

The problem becomes more complicated in a hierarchical model of parallelism where the provided number of partitions at any level in the hierarchy may be very low in comparison to the available number of central processing units (CPUs). This situation can result in decreased parallelism, and in turn, decreased performance, as the limited number of partitions fail to make use of all the available CPUs.

In a conventional hierarchical model of data partitioning, there are a fixed number of partitions at each level in the hierarchy. Each partition provides certain permissions to access particular objects. Higher levels of partitions in the hierarchy provide the full access rights of lower partitions as well as additional rights specific to that partition. For instance, each object of a given type 'x' may be mapped to a partition of type 'X'. If there are more objects than partition instances, then multiple objects are mapped to a single partition. This results in serialization of accesses to all objects that map to that partition, even though no serialization is required for correctness (it is an artifact of the architecture). The number of partitions at each level can be tuned to be efficient for a wide range of workloads, but cannot be optimal in all cases as the objects being accessed can vary in number, size, access pattern, and other attributes. Each partition is associated with a single process/thread, so if the number of used partitions is too low in comparison to the available CPUs, then all available CPUs will not be utilized.

Therefore, there is a need for a method and system where the number of partitions of each level in the hierarchy is continually tuned at runtime based on the observed workload characteristics. By providing the workload with a larger number of partitions to exploit as needed (and fewer of those that it cannot exploit) and in turn enabling it to use more CPUs, parallelism and performance can be enhanced. Such a system incorporates optimal performance in a wide range of environments including environments in which the workload continually changes over time.

SUMMARY

According to an aspect of an exemplary embodiment, a method of dynamically changing a number of partitions at runtime in a hierarchical data partitioning model includes determining a number of coarse mapping objects, determining a number of fine mapping objects, and setting a number of coarse partitions and a number of fine partitions based on the determined number of coarse mapping object and the determined number of fine mapping objects, where the determining the number of coarse mapping objects and the determining the number of fine mapping objects is based on workload analysis.

According to another exemplary embodiment, the workload analysis includes analyzing access made to different objects that map to partitions in a particular level.

According to another exemplary embodiment, the method further comprises resetting the number of coarse partitions and the number of fine partitions based on a change in the access made to different objects that map to partitions in a particular level.

According to another exemplary embodiment, the fine partitions comprise at least one stripe partition and at least one range partitions.

According to another exemplary embodiment, a number of the at least one stripe partition and a number of the at least one range partition is based on an amount of workload.

According to another exemplary embodiment, the method of dynamically changing a number of partitions at runtime in a hierarchical data partitioning model further includes setting a number of fine partitions under each of the coarse partitions based on the number of coarse partitions.

According to another exemplary embodiment, the number of fine partitions under each of the coarse partitions is the same.

According to another aspect of an exemplary embodiment, a non-transitory machine-readable medium having stored thereon instructions for performing a method comprising machine executable code which when executed by at least one machine, causes the machine to determine a number of coarse mapping objects, determine a number of fine mapping objects, and set a number of coarse partitions and a number of fine partitions based on the determined number of coarse mapping object and the determined number of fine mapping objects, where the determining the number of coarse mapping objects and the determining the number of fine mapping objects is based on workload analysis.

According to another exemplary embodiment, the workload analysis includes analyzing access made to different objects that map to partitions in a particular level.

According to another exemplary embodiment, the non-transitory machine-readable medium further causes the machine to reset the number of coarse partitions and the number of fine partitions based on a change in the access made to different objects that map to partitions in a particular level.

According to another exemplary embodiment, the fine partitions comprise at least one stripe partition and at least one range partitions.

According to another exemplary embodiment, a number of the at least one stripe partition and a number of the at least one range partition is based on an amount of workload.

According to another exemplary embodiment, the non-transitory machine-readable medium further causes the machine to set a number of fine partitions under each of the coarse partitions based on the number of coarse partitions.

According to another exemplary embodiment, the number of fine partitions under each of the coarse partitions is the same.

According to another aspect of an exemplary embodiment, a computing device includes a memory containing machine readable medium comprising machine executable code having stored thereon instructions for performing a method of dynamically changing a number of partitions at runtime in a hierarchical data partitioning model, a processor coupled to the memory, the processor configured to execute the machine executable code to cause the processor to determine a number of coarse mapping objects, determine a number of fine mapping objects, and set a number of coarse partitions and a number of fine partitions based on the determined number of coarse mapping object and the determined number of fine mapping objects, where the determining the number of coarse mapping objects and the determining the number of fine mapping objects is based on workload analysis.

According to another exemplary embodiment, the workload analysis includes analyzing access made to different objects that map to partitions in a particular level.

According to another exemplary embodiment, the machine executable code further causes the processor to reset the number of coarse partitions and the number of fine partitions based on a change in the access made to different objects that map to partitions in a particular level.

According to another exemplary embodiment, the fine partitions comprise at least one stripe partition and at least one range partitions.

According to another exemplary embodiment, a number of the at least one stripe partition and a number of the at least one range partition is based on an amount of workload.

According to another exemplary embodiment, the machine executable code further causes the processor to set a number of fine partitions under each of the coarse partitions based on the number of coarse partitions.

According to another exemplary embodiment, the number of fine partitions under each of the coarse partitions is the same.

BRIEF DESCRIPTION OF THE DRAWINGS

FIG. 12 is a flowchart depicting the process of repartitioning from a first configuration to a second configuration after analyzing the workload.

Figure 1:
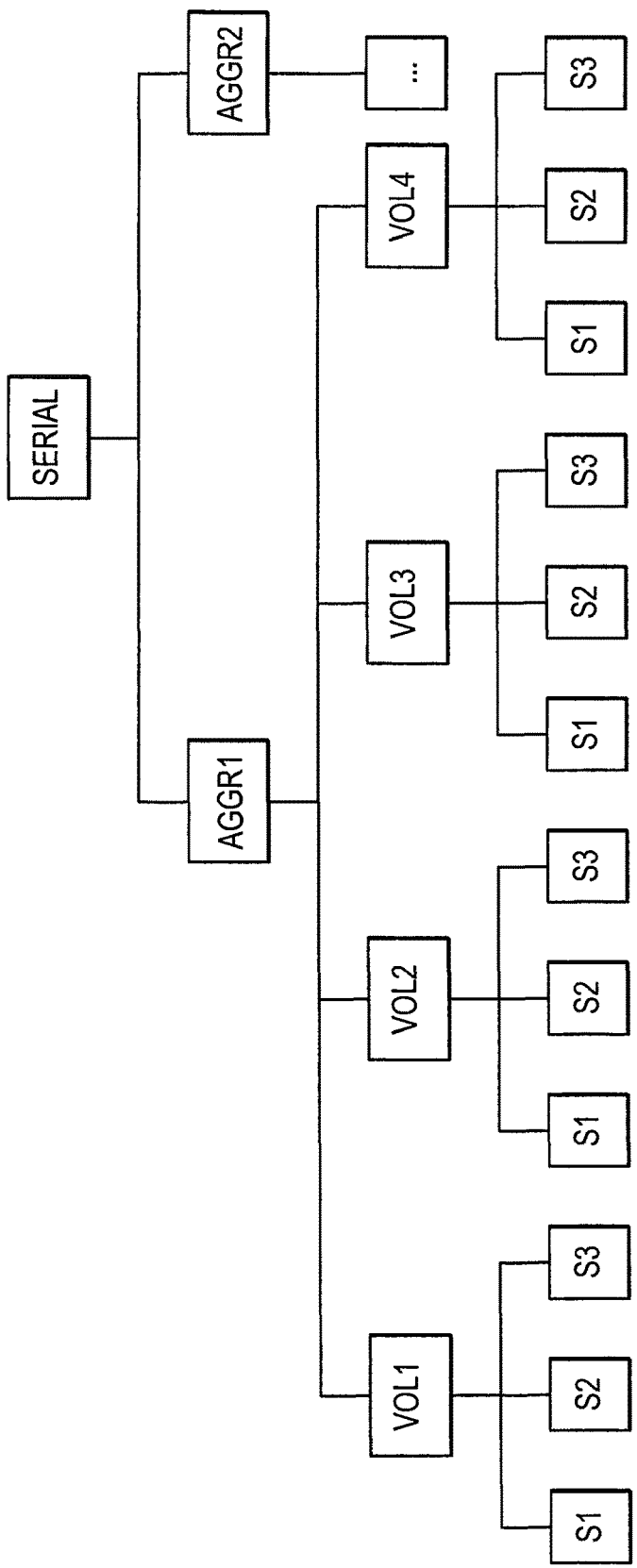
FIG. 1 depicts an exemplary embodiment of a hierarchical data partitioning model.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF THE DRAWINGS

The present disclosure is directed to methods, non-transitory computer readable media, and devices for an adaptive data-partitioning model that responds to observed workload.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

It will be understood to those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. Furthermore, flash disk arrays are also contemplated as a form of storage to which the concepts described below apply.

Moving now to the number of partitions in an adaptive data partitioning system, at each layer in the partition hierarchy, the optimal number of partitions is a function of the number of objects being accessed that map to that partition and their individual loads. In certain embodiments, the objects being referred to herein may be discrete units of storage, containing data. If accesses are being made to many different objects that map to partitions in a particular level, then it is typically beneficial to have more partitions in that level. If fewer such objects are being accessed, then fewer partitions are more efficient as they result in less overhead from unused/underused partitions. If a single configuration is always provided, then it will be suboptimal in many cases. If the workload changes over time, then it may be less feasible to involve an administrator, and instead, automatically adjust the number of partitions.

In certain embodiments, the number of objects of different type as well as their load is continually monitored at runtime and the various partition counts at each level are adjusted to improve performance. If the system anticipates that parallelism can be increased by changing the number (up or down) of one or more partition types (coarse partition or fine partition, for example) based on the data access patterns present in the workload (for example pattern of access made to different objects mapped to different partition types), then the adaptation is performed. If the workload properties change over time such that a different configuration is predicted to be optimal, then adaption is again performed. In this way, the system continually adapts to the offered workload.

Before discussing the various subdomains in detail, it may be helpful first to clarify certain terms. An "aggregate" is a logical aggregation of physical storage, combining one or more physical mass storage devices or parts thereof into a single logical storage object, which contains or provides storage for one or more other logical data sets at a higher level of abstraction (e.g., volumes). "Aggregate-level processes" are processes that are inherently applicable to an entire aggregate and that cannot be applied at a more-granular level, i.e., at a higher level of abstraction. Examples of such processes may include, for example, increasing the size of an aggregate and creating new volumes.

A "volume" is a logical data set which is an abstraction of physical storage, combining one or more physical mass storage devices (e.g., disks) or parts thereof into a single logical storage object, which obtains its storage from an aggregate and which is managed as a single administrative unit. "Volume-level processes" are processes that are inherently applicable to an entire volume, but not an entire aggregate, and that cannot be applied at a higher level of abstraction. Examples of such processes may include, for example, destroying a volume or taking a volume off-line.

In one embodiment each volume is logically divided into contiguous stripes. A "stripe", as the term is used herein, is a set of logically sequential data offsets in a set of data (e.g., a volume, file or LUN (logical unit number used to identify a logical unit)). To improve parallelism of operations on user data, each stripe is assigned to a separate thread, or Stripe subdomain in this description. In certain embodiments, a given stripe is never assigned to more than one Stripe subdomain at a time. The Stripe subdomains for any given volume have sibling relationships to each other in the hierarchy, which means that they can execute their processes in parallel with each other, at least as long as no such process targets more than one stripe. As shown, assuming a particular volume, volume 0, includes N stripes, the Stripe subdomains for volume 0 may include Stripe0, Stripe1, . . . , StripeN. Similarly, assuming another volume, volume M, includes P stripes, the Stripe subdomains for volume M may include Stripe0, Stripe1, . . . , StripeP.

Based on the above provided definitions, if all work in the system maps to a partition type "volume" and the system is configured with only two volume partitions, then the system will only be able to use two CPUs. If more than two objects mapped to a volume partition are being accessed, then increasing the number of volume partitions can increase parallelism.

It should be noted that the term processors may be referring to physical processors, logical processors, or a combination thereof.

It is important to note that a large variety of workloads can be handled by a single configuration that provides a sufficient number of partitions of each type. The majority of workloads can achieve sufficient parallelism from a single configuration. But there are at least two cases where adaptation is beneficial: 1) non-normal workloads that do not work well with the default numbers of partitions 2) normal cases that have different balances of work can still be slightly improved.

One complication with changing the number of partitions is that it is not typically feasible only to increase the number of partitions, because there is a management overhead for too many total partitions. This causes a particular problem in increasing the number of partitions higher in the hierarchy because such an increase is associated with a proportional increase in the total number of partitions lower in the hierarchy. That is, adding a new volume partition automatically comes with replicated versions of all of the finer partitions under volume. Therefore, increases in one partition count should typically come with decreases in a different partition count in order to keep the total number of partitions roughly constant.

While the proposed technique applies equally well to both flat and hierarchical models of data partitioning, herein below, focus is cast on the exemplary embodiment of hierarchical models as depicted in the drawings.

Referring now to the drawings, wherein like reference numerals refer to like features throughout the several views, there is shown in FIG. 1, an exemplary embodiment of a hierarchical data partitioning model. The exemplary embodiment of FIG. 1 depicts four partitions at the volume level and 3 at the Stripe level. Such a configuration will be suitable for workloads where there are at least 4 objects at the volume level because such a configuration can make use of all the Stripe partitions under each volume partition.

To better understand when a system would adapt to the configuration depicted in FIG. 1, let us assume that the original partition structure merely incorporates one volume level partition and two stripe level partitions under the one volume partition. The system constantly keeps a check of the workload being put on the system, and determining if accesses are being made to many different objects that map to partitions in a particular level (volume level or Stripe level according to the depicted exemplary embodiment), objects being discrete units of storage containing data. If the system determines that there are indeed 4 objects that map to the single available volume partition, the system concludes that it is beneficial to have more partitions in the volume level. Accordingly, during the reboot process, the system repartitions the volume level to incorporate four different volume partitions, allowing for the four objects, which were being mapped to the single available volume partition, to be mapped to the four volume partitions which are now available because of the repartitioning. Although the establishment of the partitions/repartitioning process has been described to take place during the reboot process, that is merely an exemplary embodiment, and the partitions may be reestablished/repartitioned at other instances as well. The above process is further explained below with reference to the illustration of a block diagram in FIG. 8 and the flowchart in FIG. 10.

A determination of the number of objects being mapped to different partitions on different levels in a hierarchical storage may be made by a constant analysis of accesses being made to objects that map to partitions. In other words, by conducting a constant review of the workload being put on the system, a determination can be made regarding the mapping of objects to different partitions, which in turn is used to determine how to repartition in order to increase parallelism and performance. The above process is further explained below with reference to the flowchart in FIG. 11

Figure 2:
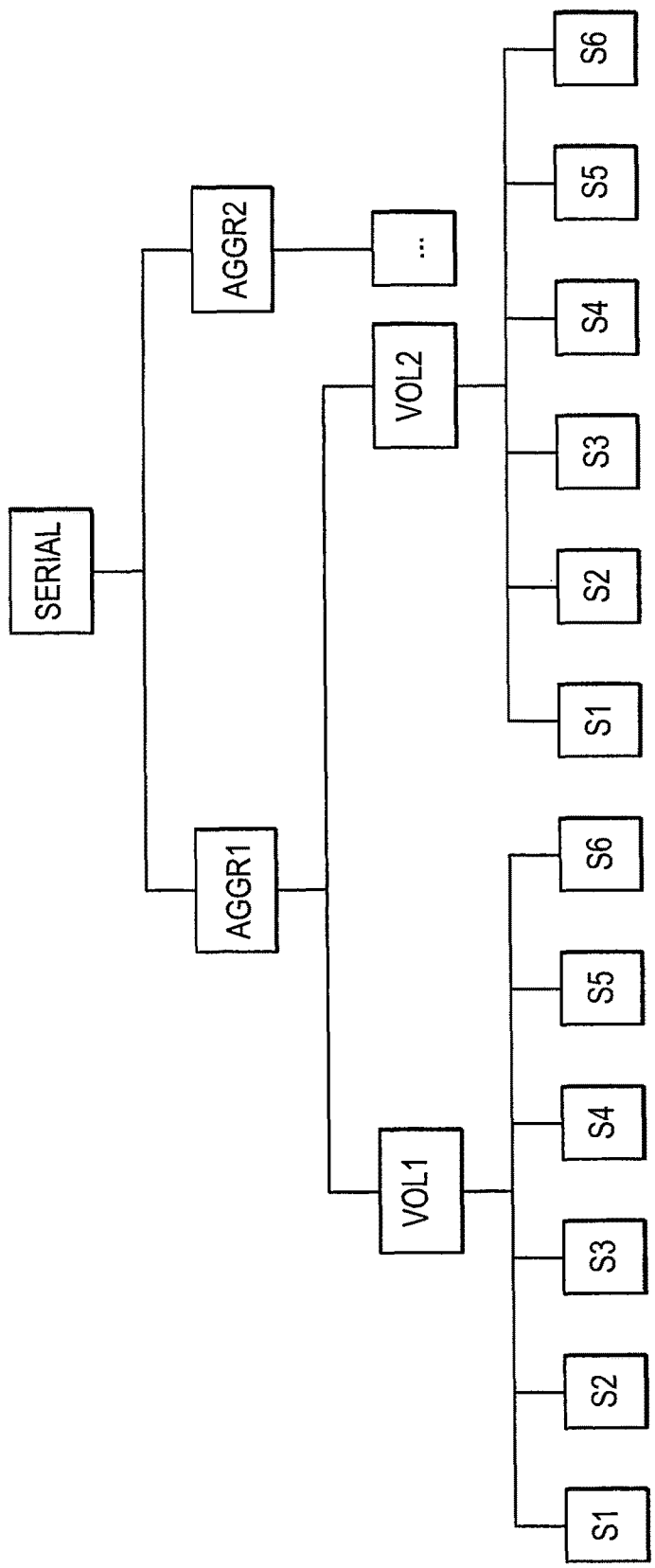
FIG. 2 depicts another exemplary embodiment of a hierarchical data partitioning model.

FIG. 2 depicts another exemplary embodiment of a hierarchical data partitioning model depicting partition configuration with more fine partitions (stripes) and fewer coarse partitions (volumes).

The exemplary embodiment hierarchy depicted in FIG. 2 depicts fewer coarse partitions and more fine partitions. Such a configuration would be beneficial if there were only two volume mapping objects, because with only two mapping objects, it would be wasteful to have more volume partitions with their full underlying hierarchies as they will remain idle under such a workload. Given that the configuration depicted in FIG. 2 only uses the partitions under these two volume partitions, it is likely necessary to increase the number of partitions under these volume partitions in order to increase the total number of active partitions which can use the available CPUs or logical processors. Thus, if the system started with the configuration depicted in FIG. 1 and determined that such a configuration was not well-suited for the workload being put on the system, based on analyzing the accesses being made to the objects on different partitions on different levels, the system could change the partition configuration on-the-fly, during a reboot process for example, to the configuration depicted in FIG. 2 in order to improve parallelism and performance. The above repartitioning process if further explained below with reference to the flowchart depicted in FIG. 12

Thus, as described above, partitions are established dynamically and can be abolished and re-established based on the amount of workload that is being observed on the partitions at each level.

A more extreme example of the above discussed configuration of FIG. 2 incorporates only a single active object at some level in the hierarchy, for example the volume partitions. Such a configuration of active objects can only make use of the partitions under that mapped volume partition. If a fixed configuration is being used, then there will likely not be enough partitions under that volume partition because it was not set up for such an extreme scenario. Thus, in case of such an extreme scenario, the partitions under one volume partition should be greatly increased to provide an ample number of partitions to achieve sufficient parallelism in the system. This all assumes that there is sufficient load to a sufficient number of objects at the lower levels to make use of the newly added partitions under said volume partition. If not, then the above described reconfiguration will not be beneficial.

Figure 3:
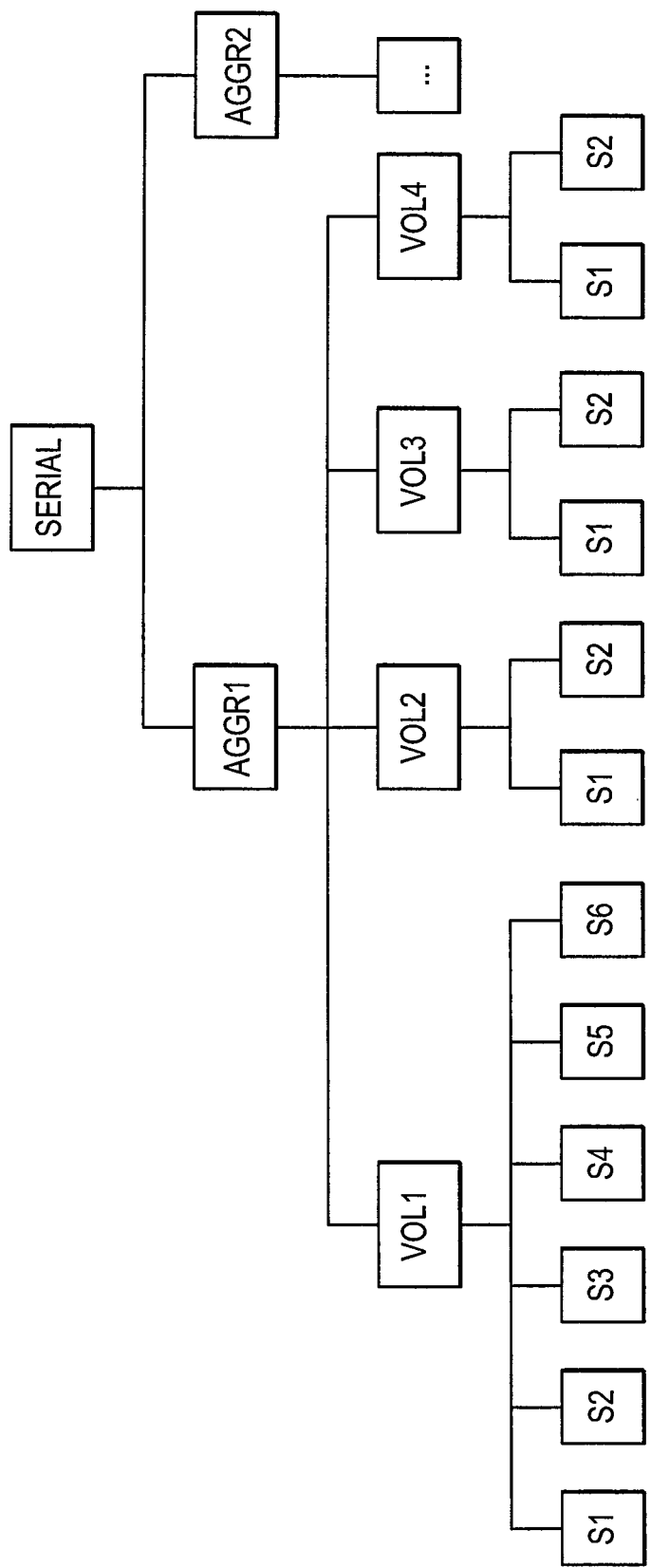
FIG. 3 depicts another exemplary embodiment of a hierarchical data partitioning model.

FIG. 3 depicts another exemplary embodiment of a hierarchical data partitioning model depicting varying number of fine partitions.

The utilization of fine partitions depends on the workload within objects that map to coarser partitions. For example, a volume data object maps to the volume partition. Data blocks within this volume map to Stripe partitions. The workload can vary between volumes such that the optimal number of Stripe partitions can vary. Or the load accessing blocks in one volume may be much higher than in another volume. In such scenarios, it is beneficial to allocate more fine partitions (such as Stripes) to one volume partition than another. FIG. 3 illustrates such a configuration by depicting partition configuration with more fine partitions under one coarse partition and fewer fine partitions under a different coarse partition.

Figure 4:
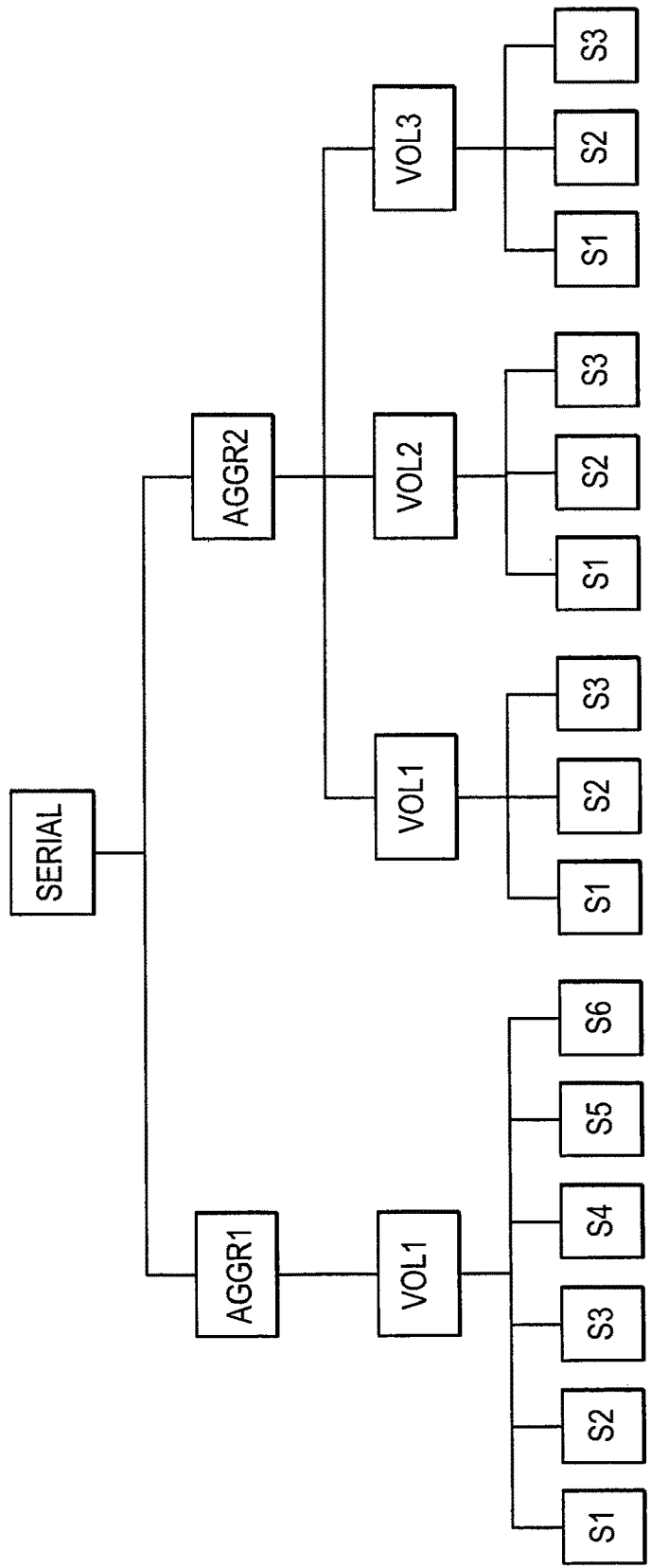
FIG. 4 depicts another exemplary embodiment of a hierarchical data partitioning model.
Figure 5:
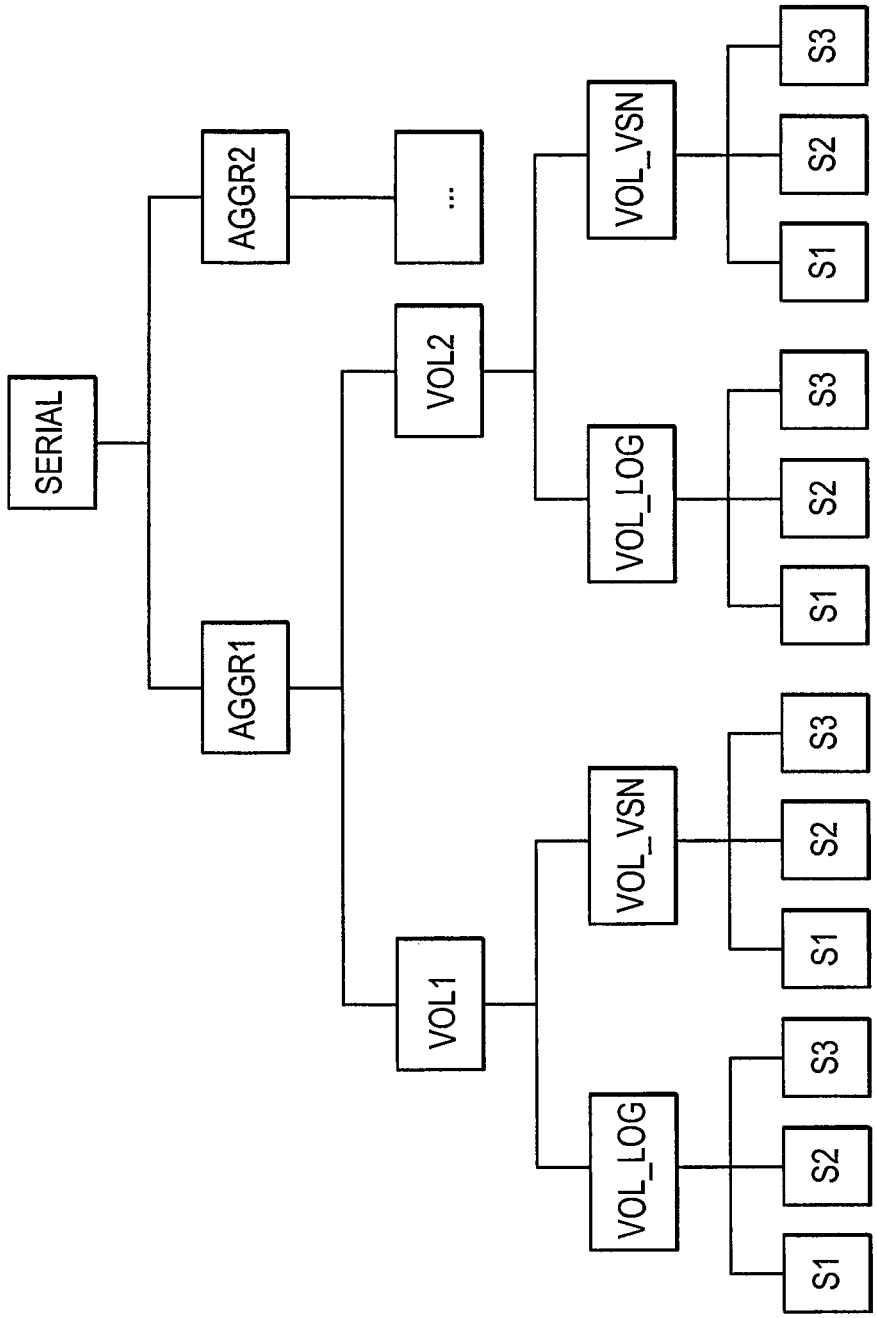
FIG. 5 depicts another exemplary embodiment of a hierarchical data partitioning model.

The same property can hold at higher levels in the hierarchy, an exemplary embodiment of which is depicted in FIG. 4. For example, there may be a different number of "volume" data objects (mapping to volume partitions) under one Aggregate partition than under a different Aggregate partition. In such a case, it is beneficial to provide a different number of volume partitions under different Aggregate partitions as shown in FIG. 4. In such a scenario, it is likely beneficial to provide more fine partitions under the lone volume partition than under the other Aggregate partition in order that the Aggregate partition will be able to use a reasonable number of CPUs. FIG. 4 depicts such a partition configuration with more volume partitions under one Aggregate partition and fewer volume partitions under a different Aggregate partition FIG. 5 depicts another exemplary embodiment of a hierarchical data partitioning model which balances the number of different types of fine partitions.

The above exemplary embodiments depicted in FIGS. 1-4 have one type of fine partition (a partition with no sub-partitions). In practice, a partition can have different types of fine partitions under it that handle different types of work. FIG. 5 depicts such an exemplary embodiment of a partition configuration with an equal number of fine Stripe and Range partitions.

Figure 6:
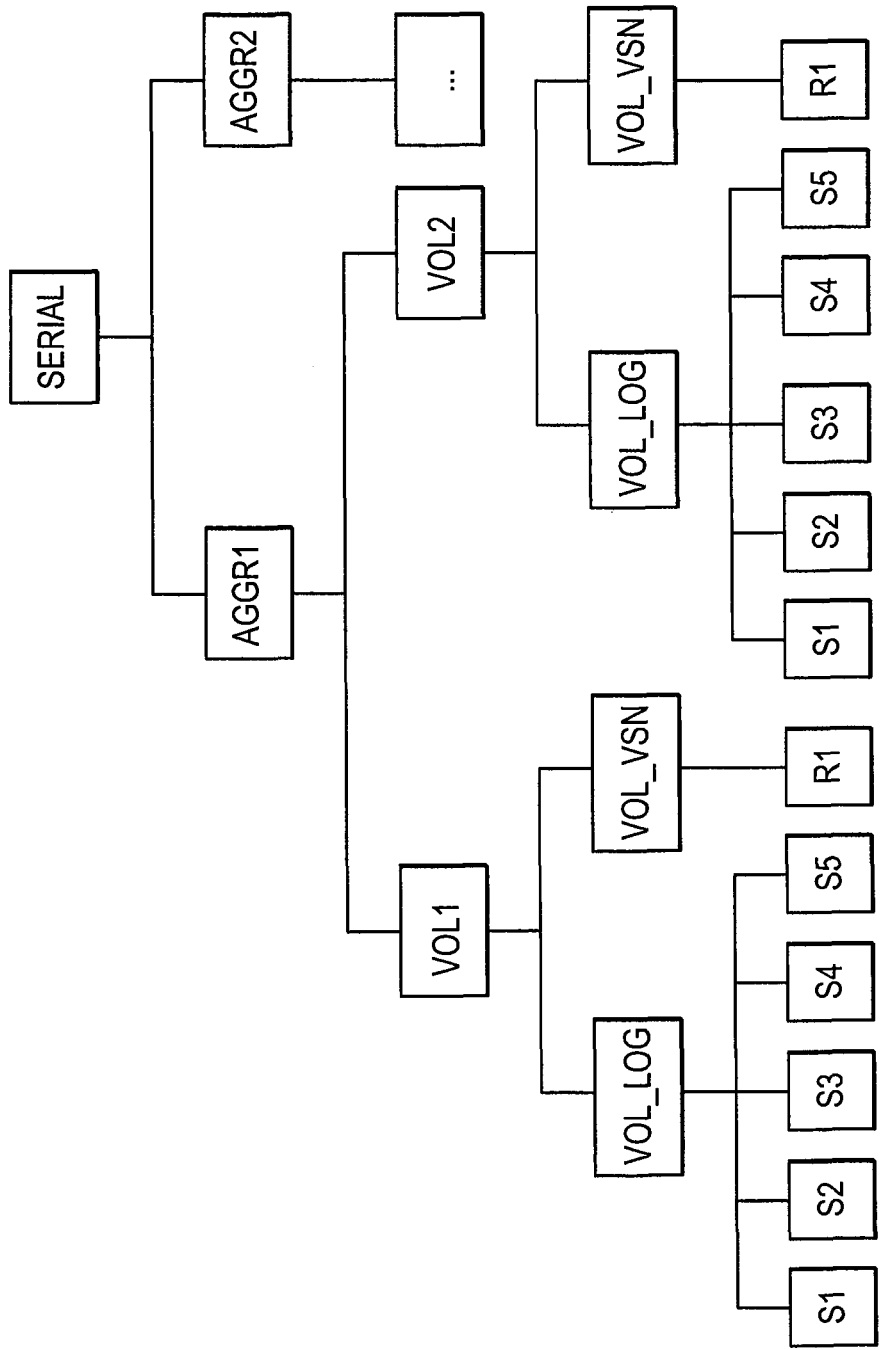
FIG. 6 depicts another exemplary embodiment of a hierarchical data partitioning model.

Depending on the workload, there may be varying amounts of work mapped to the partitions of these different types. For example, as depicted in FIG. 6, there may be a workload that suffers under the above configuration due to an imbalance in the quantity of work going to Stripe partition in comparison to the quantity of work going to Range partitions. In such a scenario, it would make sense to provide more Stripe partitions and fewer Range partitions. Thus, FIG. 6 depicts such a configuration with more Stripe partitions and fewer Range partitions.

Figure 7:
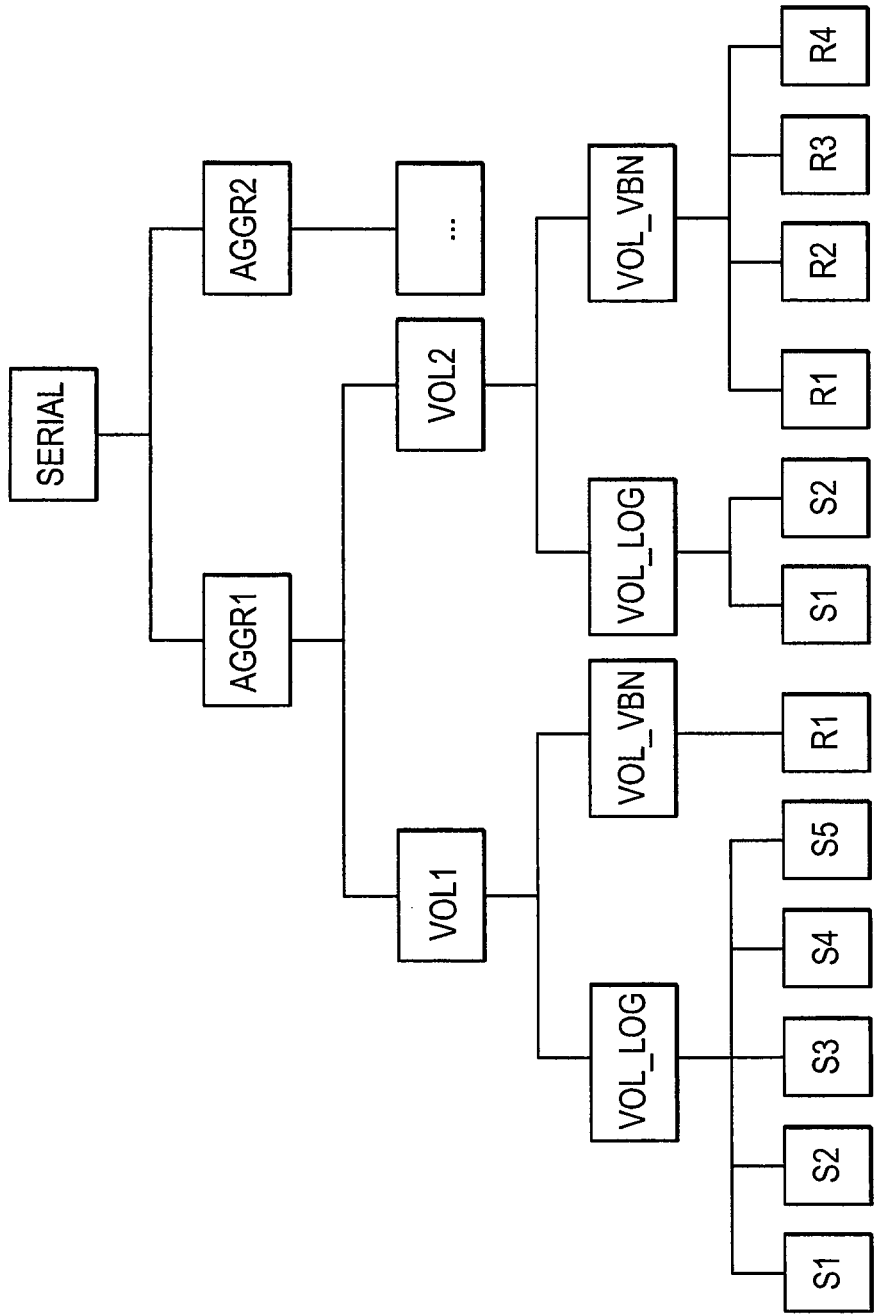
FIG. 7 depicts another exemplary embodiment of a hierarchical data partitioning model.

Further, the ratio of Stripe work to Range work may vary between volumes. In such a case, it is beneficial to allocate a different ration of Stripe to Range partitions under different volumes. Such a configuration is presented in FIG. 7. As can be seen in FIG. 7, the partition configuration comprises fine partitions balanced differently between Stripes and Ranges under different volume partitions.

In effect, changing the balance in the number of partitions of different types at a fine level can allocate CPU usage (computational bandwidth) in the form of the number of partitions to different types of work based on the observed workload.

In certain workloads, the work will map primarily to coarse data partitions. If only coarse partitions are being used, a much larger number of coarse partitions and a much smaller number of fine partitions within each coarse partition are beneficial to enhance parallelism.

Figure 8:
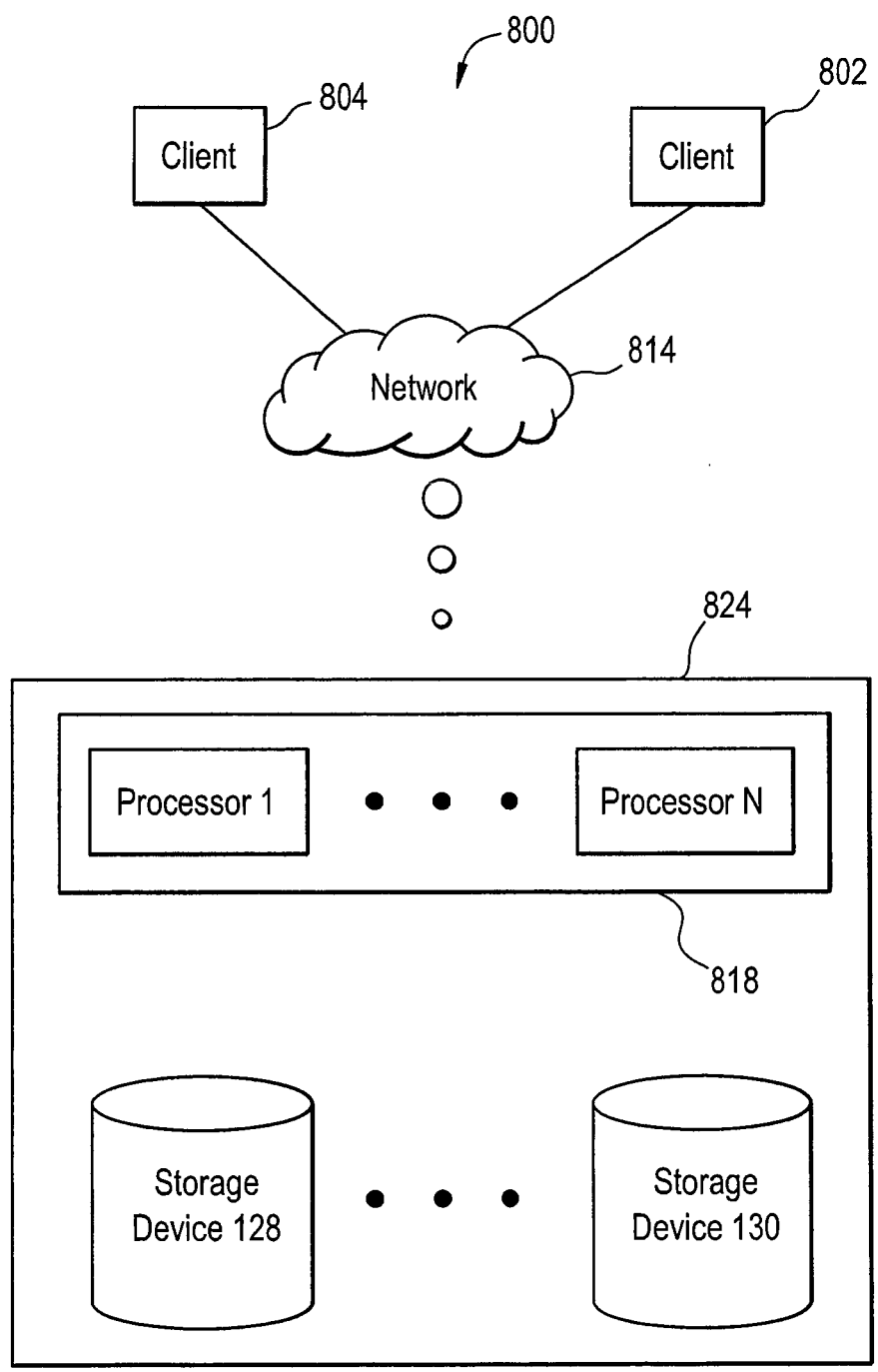
FIG. 8 depicts a block diagram of an example of a system comprising a storage server, in accordance with an exemplary embodiment.

FIG. 8 depicts a block diagram of an example of a system 800, in accordance with an exemplary embodiment of the present disclosure. The system 800 includes clients 802 and 804 and storage server 824. The clients, 802 and 804, may be computers or other processing systems capable of accessing the storage server 824 either directly or indirectly over a network 814. The clients, 802 and 804, may access the storage server 824 over the network 814 using wireless or wired connections supporting one or more point-to-point links, shared local area networks (LAN), wide area networks (WAN), or other access technologies. These clients, 802 and 804, may be accessing data, applications, raw storage, or various combinations thereof stored on the storage server 824. The workload being put by the clients, 802 and 804, is tracked or analyzed to determine the optimum partition structure, as described in the flowcharts depicted in FIG. 10 and FIG. 11.

According to the exemplary embodiment depicted in FIG. 8, the system 800 is a type of storage system that provides storage services to clients 802 and 804 using, for example, storage area network (SAN), network-attached storage (NAS), or other storage technologies processed on multiple processors 818. However, it should be appreciated that alternate embodiments of the multiprocessor system 800 may deliver other types of computer services on a multi-processor platform. For example, the storage server 824 may include web server technologies that deliver web pages and web services to the clients, 802 and 804, over the Internet. In other embodiments, the storage server 824 may include other general purpose applications that can deliver various functionalities or data to the clients, 802 and 804.

The storage server 824 is configured to operate according to a client/server model of information delivery thereby allowing multiple clients to access files or other data simultaneously. In this model, the client 802 or 804 may be a computer running an application, such as a file-system protocol. Each client, 802 and 804, may request the services of the storage server 824 by issuing storage-system protocol messages. For example, the clients, 802 and 804, can request to either read data from or write data to the storage server 824.

In the exemplary embodiment depicted in FIG. 8, the storage server 824 is a file-level server, such as a server used in a NAS environment, a block-level storage server used in a SAN environment, or other storage systems capable of providing both file-level and block-level service. For example, the storage server 824 may use a combination of software and hardware to provide storage services including the organization of information on storage devices 828 and 830, such as disks. The storage server 824 includes a file system to organize logically the information as a hierarchical or other structure of directories and files on the disks 828 and 830.

Although the storage server 824 is illustrated as a single unit in FIG. 8, it can also be implemented in a distributed architecture. For example, the storage server 824 can be implemented with multiple distributed storage servers (not shown). Additionally, the storage server 824 can also include a physically separate network module and disk module (not shown), which communicate with other storage servers over an external interconnect. The network module functions as a front-end of the storage server 824, exporting services to the clients, 802 and 804. The disk module functions as the back-end, managing and implementing a parity de-clustered distribution of a RAID organization on the underlying storage of the storage server 824.

In a system 800, the storage server 824 uses two or more processors, as represented by processors 818, which may also include multiple core processor designs. The processors 818 represent two or more computational units available in the storage server 824, may be a physical aggregation of multiple individual processors that each individually execute threads. Alternate implementations of processors 818 may be a single processor having multiple on-chip cores that may partition and share certain resources on the processor die such as the L1/L2 cache. Therefore, the term "processor," as used herein, could be applied to designs utilizing one core or multiple cores found on a single chip or die. Furthermore, the term "processor" is intended to mean either a physical processor or a logical processor. Likewise, thread execution is used to describe the act of executing a set of related instructions on one or several processors. As used herein, a "thread" refers to a separate stream of execution that takes place simultaneously with and independently of other steams of execution. As an example, a thread can be a single sequence of instructions executed in parallel with other sequence of instructions, either by time slicing or multiprocessing. This allows a program to split itself into two or more simultaneously running tasks. Unlike processes, multiple threads can share state information of a single process, share memory, and other resources directly.

Figure 9:
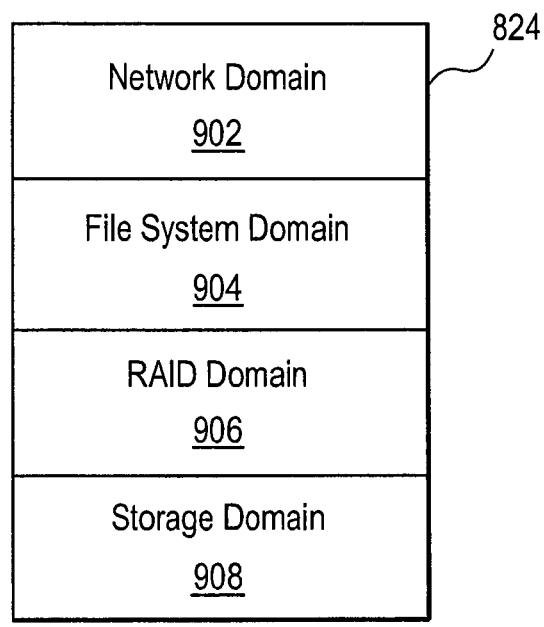
FIG. 9 depicts a block diagram illustrating examples of multiple domains within an exemplary embodiment of a storage server.

In accordance with embodiments of the present disclosure, the storage server 824 can be configured to adjust a number of threads for execution by the processors 818 based on monitoring utilizations of multiple domains. FIG. 9 depicts a block diagram illustrating examples of multiple domains, consistent with an embodiment. It should be appreciated that threads to be executed are divided into a set of domains according to their functionality and tasks they perform. Therefore, a "domain," as used herein, refers to a grouping of threads based on a common functionality. Accordingly, threads are scheduled according to their assigned domain, which allow for multiprocessor parallel execution, in accordance with an embodiment of the present disclosure. For example, as depicted in the exemplary embodiment of FIG. 9, a storage server may implement multiprocessing using the following set of domains: a network domain 902, file system domain 904, a RAID domain 906, and a storage domain 908. As implied by their names, the network domain 902 includes threads related to performing network specific functions. The file system domain 904 includes threads related to file system functions. The RAID domain 906 includes threads dealing with implementing the RAID functions and different levels of RAID (e.g., RAID-0 through RAID-5). The storage domain 908 includes threads directly related to operating storage devices.

Figure 10:
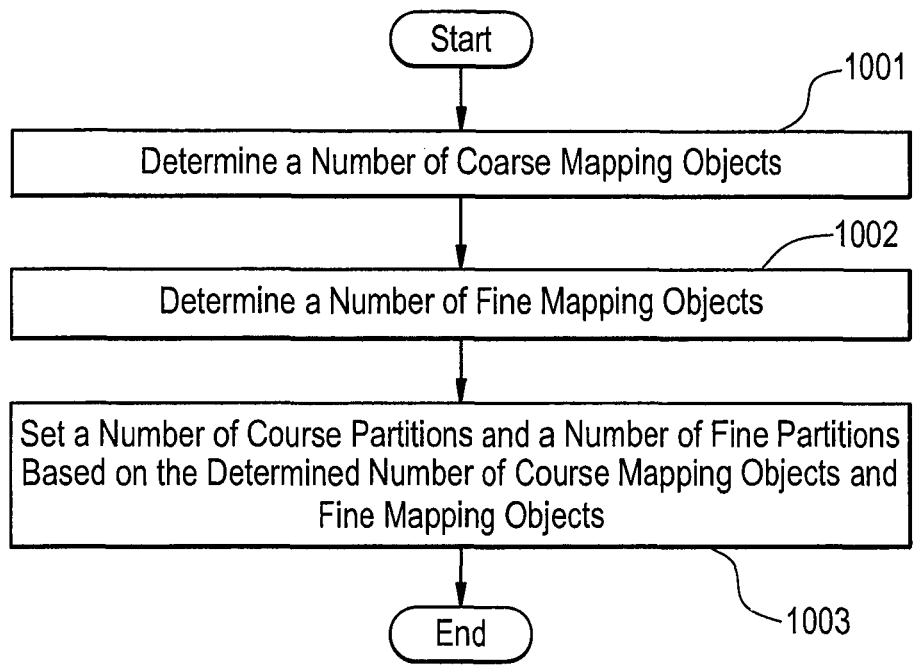
FIG. 10 is a flowchart depicting the process to dynamically determine the number of coarse and fine partitions at runtime in a hierarchical data partitioning model.

FIG. 10 is a flowchart depicting the process to dynamically determine the number of coarse and fine partitions at runtime in a hierarchical data partitioning model.

In step 1001, a number of coarse mapping objects is determined. In step 1002, a number of fine mapping objects are determined. In step 1003, a number of coarse partitions and a number of fine partitions are set based on the determined number of coarse mapping object and the determined number of fine mapping objects. Thus, by using the determined number of coarse and fine mapping objects, an appropriate number of coarse and fine partitions can be set, thereby maximizing parallelism.

Figure 11:
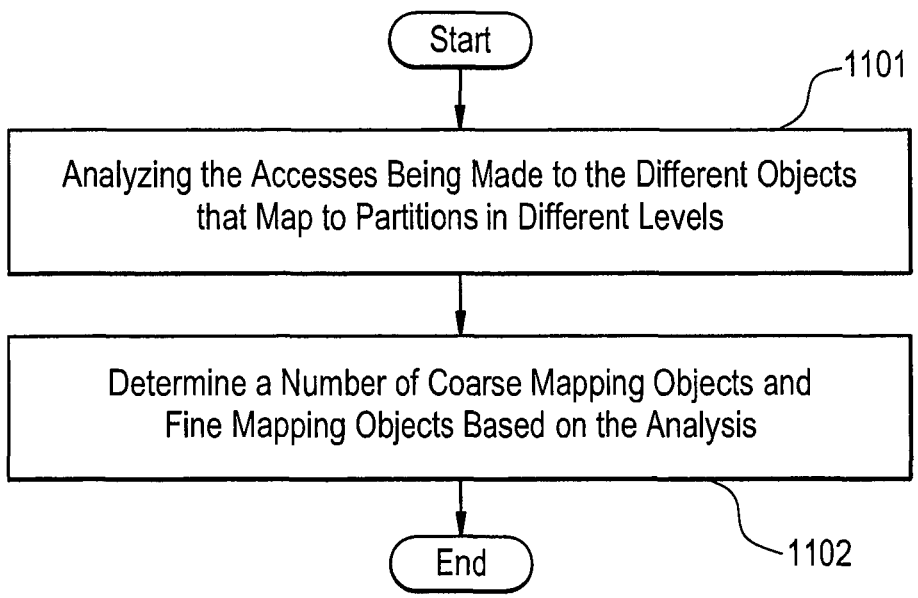
FIG. 11 is a flowchart depicting the process to determine the number of coarse and fine mapping objects which are used to dynamically determine the number of partitions at runtime in a hierarchical data partitioning model.

FIG. 11 is a flowchart depicting the process to determine the number of coarse and fine mapping objects which are used to dynamically determine the number of partitions at runtime in a hierarchical data partitioning model.

In step 1101, an analysis is performed on the accesses being made to the different objects that map to partitions in different levels. This can be performed by conducting a real time tracking of the workload. Based on the analysis, in step 1102, a number of coarse mapping objects and fine mapping objects are determined. According to the exemplary embodiment, if multiple accesses are being made on four objects that are mapped to a partition on the coarse level, it is determined that the coarse level incorporates four objects. This information is then used to repartition, based on the flowchart of FIG. 10, to incorporate four partitions at the coarse level to handle the four objects simultaneously, thereby increasing parallelism and performance.

FIG. 12 is a flowchart depicting the process of repartitioning from a first configuration to a second configuration after analyzing the workload.

As can be seen, in step 1201, the system maintains a partition based on a first configuration. However, during runtime, the system continuously monitors the workload being put on the system, step 1202. Based on the workload, a determination is made, in step 1203, regarding the efficiency of the first configuration that is being maintained. As described above, the analysis of the workload may be performed by analyzing accesses being made to the objects mapped to different partitions on different levels, which in turn is used to determine the number of coarse and fine mapped objects, as described in FIGS. 10 and 11. Lastly, in step 1204, repartitioning is performed to a second configuration which provides enhanced performance in light of the recently analyzed workload.

While a number of different exemplary embodiments of configuration are described above, it does not cover a comprehensive list of when dynamically changing the number of partitions at runtime might be beneficial.

The system described through the numerous exemplary embodiments above helps performance because in dynamically adapting the number of partitions, the available parallelism in the system can be increased which can improve overall performance. Specifically, parallelism is increased because operations on independent data can be mapped to different partitions by increasing the number of partitions.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects. An implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the following claims.

What is claimed:

1. A method comprising:
using by a processor, a hierarchical partitioning model in a first configuration comprising of a coarse partition level and an associated fine partition level for storing and retrieving data from a plurality of storage devices of a networked storage system, wherein the coarse partition level and the fine partition level include a number of partitions, each partition associated with a processor executable thread; wherein the number of partitions for each level are based on a number of different objects mapped to each partition level and accessed by a plurality of threads in parallel;
identifying by the processor, a real-time data access pattern for the different objects mapped to the coarse partition level and the fine partition level for a plurality of workloads;
determining by the processor that parallelism among the plurality of threads can be increased by modifying the first configuration for the plurality of workloads; and
dynamically updating by the processor, one or both of the coarse partition and the fine partition levels for a second configuration for providing parallel access to the plurality of threads to the different objects, in response to determining increase in parallelism.

2. The method of claim 1, wherein the plurality of workloads are evaluated in real time for identifying the data access pattern.

3. The method of claim 1, wherein the second configuration is reset to the first configuration based on a change in data access pattern detected in real-time.

4. The method of claim 1, wherein a number of partitions at the fine partition level and the coarse partition level are different.

5. The method of claim 1, wherein a number of partitions at the fine partition level and the coarse partition level are equal.

6. The method of claim 1, wherein at least one partition at the fine partition level is associated with a stripe based on an amount of workload associated with the stripe.

7. The method of claim 1, wherein a number of partitions for the fine partition level are based on a number of partitions at the coarse partition level.

8. A non-transitory machine readable medium having stored thereon instructions comprising machine executable code which when executed by a machine, causes the machine to:
use by a processor, a hierarchical partitioning model in a first configuration comprising of a coarse partition level and an associated fine partition level for storing and retrieving data from a plurality of storage devices of a networked storage system, wherein the coarse partition level and the fine partition level include a number of partitions, each partition associated with a processor executable thread; wherein the number of partitions for each level are based on a number of different objects mapped to each partition level and accessed by a plurality of threads in parallel;

identify by the processor, a real-time data access pattern for the different objects mapped to the coarse partition level and the fine partition level for a plurality of workloads;

determine by the processor that parallelism among the plurality of threads can be increased by modifying the first configuration for the plurality of workloads; and dynamically update by the processor one or both of the coarse partition and the fine partition levels for a second configuration for providing parallel access to the plurality of threads to the different objects, in response to determining increase in parallelism.

9. The non-transitory machine readable medium of claim 8, wherein the plurality of workloads are evaluated in real time for identifying the data access pattern.

10. The non-transitory machine readable medium of claim 8, wherein the second configuration is reset to the first configuration based on a change in data access pattern detected in real-time.

11. The non-transitory machine readable medium of claim 8, wherein a number of partitions at the fine partition level and the coarse partition level are different.

12. The non-transitory machine readable medium of claim 8, wherein a number of partitions at the fine partition level and the coarse partition level are equal.

13. The non-transitory machine readable medium of claim 8, wherein at least one partition at the fine partition level is associated with a stripe based on an amount of workload associated with the stripe.

14. The non-transitory machine readable medium of claim 8, wherein a number of partitions for the fine partition level are based on a number of partitions at the coarse partition level.

15. A system, comprising:

a memory containing machine readable medium comprising machine executable code having stored thereon instructions; and a processor coupled to the memory, the processor configured to execute the machine executable code to:

use a hierarchical partitioning model in a first configuration comprising of a coarse partition level and an associated fine partition level for storing and retrieving data from a plurality of storage devices of a networked storage system, wherein the coarse partition level and the fine partition level include a number of partitions, each partition associated with a processor executable thread; wherein the number of partitions for each level are based on a number of different objects mapped to each partition level and accessed by a plurality of threads in parallel;

identify a real-time data access pattern for the different objects mapped to the coarse partition level and the fine partition level for a plurality of workloads;

determine that parallelism among the plurality of threads can be increased by modifying the first configuration for the plurality of workloads; and dynamically update by the processor one or both of the coarse partition and the fine partition levels for a second configuration for providing parallel access to the plurality of threads to the different objects, in response to determining increase in parallelism.

16. The system of claim 15, wherein the plurality of workloads are evaluated in real time for identifying the data access pattern.

17. The system of claim 15, wherein the second configuration is reset to the first configuration based on a change in data access pattern detected in real-time.

18. The system of claim 15, wherein a number of partitions at the fine partition level and the coarse partition level are different.

19. The system of claim 15, wherein a number of partitions at the fine partition level and the coarse partition level are equal.

20. The system of claim 15, wherein at least one partition at the fine partition level is associated with a stripe based on an amount of workload associated with the stripe.

21. The system of claim 15, wherein a number of partitions for the fine partition level are based on a number of partitions at the coarse partition level.

* * * * *